US008600981B1

(12) United States Patent
Chau et al.

(10) Patent No.: US 8,600,981 B1
(45) Date of Patent: Dec. 3, 2013

(54) USING ACTIVITY STATUS TO ADJUST ACTIVITY RANKINGS

(75) Inventors: Stephen Chau, Palo Alto, CA (US); Andrew T. Szybalski, San Francisco, CA (US); Stephane Lafon, Sunnyvale, CA (US); Andrea Lynn Frome, Berkeley, CA (US); Jerry Howard Morrison, Mountain View, CA (US); Derek Prothro, San Mateo, CA (US); Huy Nguyen, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/333,987

(22) Filed: Dec. 21, 2011

Related U.S. Application Data

(60) Provisional application No. 61/425,710, filed on Dec. 21, 2010.

(51) Int. Cl.
*G06F 7/00* (2006.01)
*G06F 17/30* (2006.01)

(52) U.S. Cl.
CPC ............... *G06F 17/30867* (2013.01)
USPC ......................................... 707/723; 707/725

(58) Field of Classification Search
CPC ................................................ G06F 17/30867
USPC .............................................................. 707/723
See application file for complete search history.

(56) References Cited

U.S. PATENT DOCUMENTS

| | | | | |
|---|---|---|---|---|
| 7,131,134 B2* | 10/2006 | Trovato et al. | .................. | 725/46 |
| 7,788,598 B2* | 8/2010 | Bansal et al. | ................. | 715/810 |
| 2006/0053043 A1* | 3/2006 | Clarke | ............... | 705/8 |
| 2007/0094065 A1* | 4/2007 | Wu et al. | ............... | 705/9 |
| 2009/0077000 A1* | 3/2009 | Begole et al. | .................. | 706/54 |
| 2010/0076857 A1* | 3/2010 | Deo et al. | ......... | 705/26 |
| 2010/0082376 A1* | 4/2010 | Levitt | ................ | 705/7 |
| 2010/0125911 A1* | 5/2010 | Bhaskaran | ....................... | 726/23 |
| 2010/0174709 A1* | 7/2010 | Hansen et al. | ................ | 707/728 |
| 2011/0276565 A1* | 11/2011 | Zheng et al. | .................. | 707/724 |

* cited by examiner

*Primary Examiner* — Miranda Le
(74) *Attorney, Agent, or Firm* — McDermott Will & Emery LLP

(57) ABSTRACT

Configurations for processing status-related and time-related signals for activities are disclosed. A given activity can be stored in a global activity database that includes data defining two or more activities. The data for each activity includes one or more global parameters. The global parameters include a timing-related priority. The time-related signal is related to at least one time-related parameter of the one or more global parameters. An activity assistant server can update the timing-related priority of the given activity based on the time-related signal using the activity assistant server. The activity assistant server can determine a subset of the plurality of activities. The activity assistant server can determine a rank for each activity in the determined subset of the plurality of activities based at least in part on the timing-related priority.

15 Claims, 9 Drawing Sheets

USING ACTIVITY STATUS TO ADJUST ACTIVITY RANKINGS

CROSS-REFERENCE TO RELATED APPLICATIONS

The present application claims the benefit of priority under 35 U.S.C. §119 from U.S. Provisional Patent Application Ser. No. 61/425,710 entitled "METHOD AND APPARATUS FOR USING ACTIVITY STATUS TO ADJUST ACTIVITY RANKINGS," filed on Dec. 21, 2010, the disclosure of which is hereby incorporated by reference in its entirety for all purposes.

BACKGROUND

Various technologies can be utilized to electronically exchange information between users. For example, computers, telephones, and personal digital assistants (PDAs) can be used to exchange content over communication networks including the Internet. The content exchanged between such devices can include web pages that, in turn, can include text, video data, audio data and/or other types of data.

SUMMARY

Disclosed herein are configurations of the subject technology that relate to an "activity assistant" that provides users with dynamically-selected "activities" that are intelligently tailored to the user's world. Accordingly, an example activity assistant customizes display of a user's activity list, suggests activities, and customizes activity search results based on personalized factors, e.g., the user's interests, current mood, and intent. Furthermore, an example activity assistant also is capable of intelligently varying the behavior of a given activity from one user to another, depending upon the characteristics of a given user. For example, the activity assistant scores an activity based not only on the characteristics of the activity itself, but also based on data that is indicative of the user's "context" (e.g., the user's, interests, intents, moods, experiences, etc.).

According to an example implementation, a user interface is also provided that allows for intuitive user interaction with activities via the activity assistant. This user interface is generally referred to herein as an "activity assistant user interface". A user typically accesses the activity assistant UI by logging in to a user's activity-assistant account. According to an example implementation, the activity assistant UI displays graphical and textual representations of activities to a user in a logical manner that varies according to the interests, intents, and moods of the user. Via the activity assistant UI, the user views activities they have added to a personal "activity list," views suggested activities, creates and adds new activities to their activity list, and/or add/delete existing activities (i.e. those created by other users) to/from their activity list, among other functions.

In particular, configurations of the subject technology are presented herein related to processing status-related and time-related signals for activities. A given activity can be stored by an activity assistant server in a global activity database that includes data defining two or more activities. The data for each activity includes one or more global parameters. The global parameters include a timing-related priority. The time-related signal is related to at least one time-related parameter of the one or more global parameters. An activity assistant server can update the timing-related priority of the given activity based on the time-related signal using the activity assistant server. The activity assistant server can extract a subset of the plurality of activities. The subset can include the given activity. The activity assistant server can determine a rank for each activity in the extracted subset of the plurality of activities. The rank can be based at least in part on the timing-related priority. The activity assistant server can select an activity list from the ranked subset of the plurality of activities based on the ranks of activities in the extracted subset of the plurality of activities.

The subject technology provides for, in some configurations, receiving a time-related signal for a given activity, the given activity stored in a global activity database that comprises data defining a plurality of activities, in which the data for the given activity is associated with one or more global parameters, the global parameters including a timing-related priority, and in which the time-related signal is related to at least one time-related parameter of the one or more global parameters. The timing-related priority of the given activity is then updated based on the time-related signal. The subject technology determines a subset of the plurality of activities as being related to the given activity based on one or more activities. In some configurations, the subset includes the given activity. A rank is determined for the one or more determined activities based at least in part on the timing-related priority. An activity list is selected from the ranked subset of the plurality of activities based on the ranks of activities in the determined subset of the plurality of activities. Further, the subject technology generates an activity list display of the activity list.

In one example, stored time-related parameters can be used to aid a user when performing a recurring activity. By utilizing stored timing-related parameters, e.g., duration and activity completion history, of this activity, an activity assistant could estimate how long the activity would take in the future and remind the user when they should complete activity again. The time-related parameter of duration of an item or "lead time" can be combined with the activity completion history by the activity assistant to decide how soon to start reminding the user that an activity needs to be performed again.

The activity assistant can use signals to infer the level of user intent and interest. For example, when a user marks an activity "completed" once every two weeks, the activity assistant can infer that the activity can have a higher-priority and/or be rescheduled around two weeks after it was last done. If a user has repeatedly lowered a timing-priority of an item, the activity assistant can infer that the activity can have a lower-priority and/or be rescheduled more than two weeks after it was last done.

DETAILED DESCRIPTION

Figure 1:
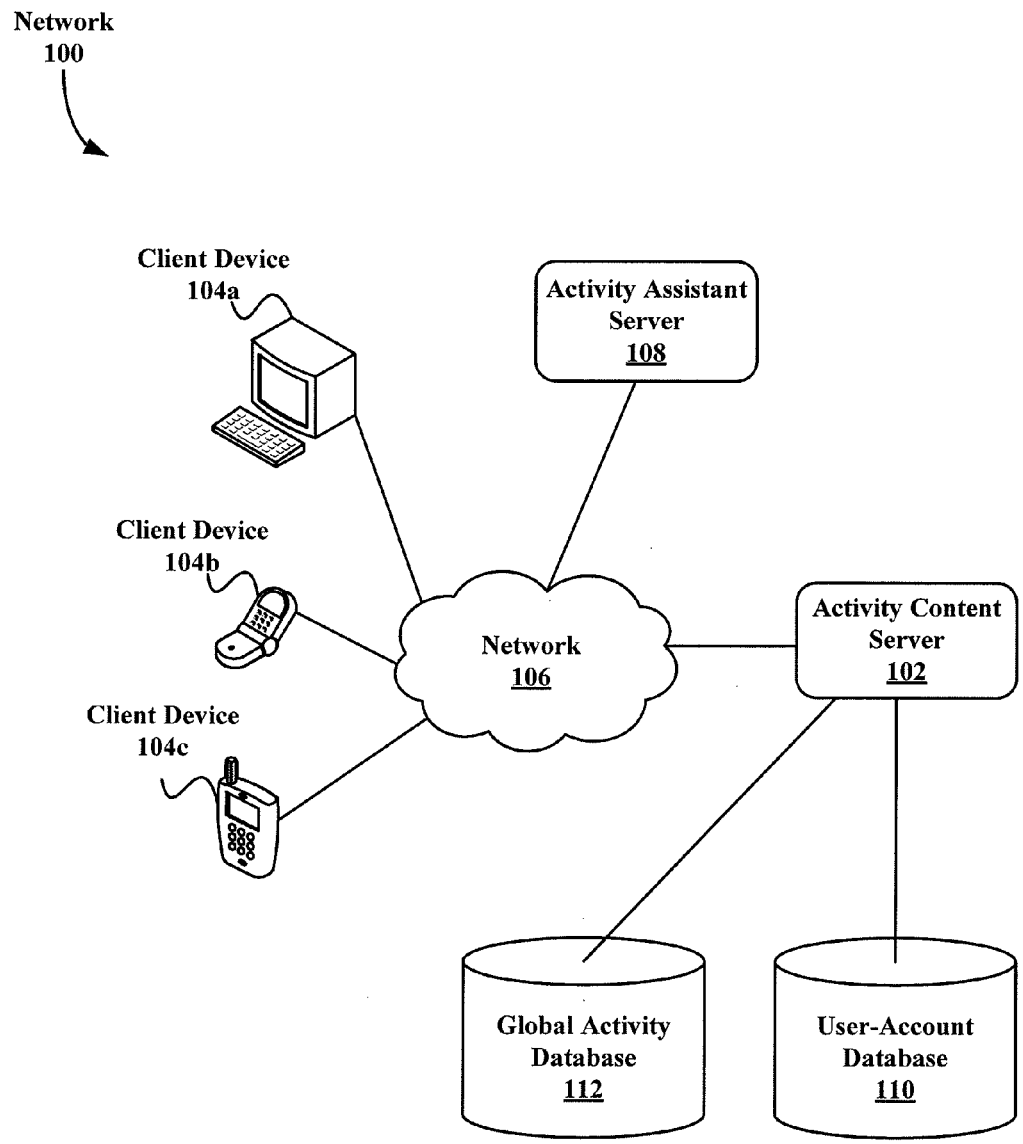
FIG. 1 depicts a network in accordance with an example implementation.

An "activity", as used herein, can be represented as a data construct describing a thing to do, for example, which a user can associate with a user's "activity-assistant account." In an example implementation, an activity is defined at least in part by one or more singular, global activity parameters. For example, global parameters for a given activity may include: (a) a title or text description (e.g., "get brunch at Boogaloo's restaurant"), (b) data indicating the location that is associated with the activity (e.g., a latitude/longitude and/or a street address of Boogaloo's restaurant), (c) data indicating one or more user "moods" that may be indicative of the activity being more or less well-suited for a given user at a given point in time (e.g., "fun", "social", "cerebral", "productive", "ambitious", etc.), (d) data indicating time constraints on the activity (e.g., the hours that Boogaloo's restaurant is open and/or the hours during which Boogaloo's restaurant serves brunch), and (e) any other data that may be directly or indirectly interpreted to affect the importance of a given activity to a given user.

Generally, an activity is a user-defined construct, and thus the global parameters that define each activity may vary. In particular, a given activity may include all of the above-mentioned global activity parameters, a subset of the above-mentioned parameters, or none of the above-mentioned parameters. For example, a user may create an activity that is not tied to any particular location (e.g., "do homework for math class"), and thus choose not to provide a location. Furthermore, as activities are flexible and dynamic constructs, it should be understood that the above-mentioned examples of global parameters are not limiting.

In some implementations, an activity may be generated by a computing device without any initial user input (or alternatively, generated based on some user-provided input). For example, in scheduling a recurring activity, e.g., a weekly workout session, a user could send a request to a computing device to generate a series of activities—one for each workout session. As another example, when planning a trip (or other project), a computing device could generate a series of activities for various stages of a trip; e.g., an activity to get tickets, an activity to get passport/visa for international trips, activities corresponding to various events during the trip, etc. Many other examples of computing-device generated activities are possible as well.

Once an activity is created, its global parameters may be applied to all users who add the activity or become associated with the activity. Thus, in effect, there is a single copy of each activity and its global parameters that is common to all those users. It should be understood, however, that global parameters can still be flexible and dynamic, and may change over time in relation to the activity. For example, a "popularity" parameter may be defined for an activity that is updated on an ongoing basis to reflect the number of users that have added the activity.

To further allow for customization of activities to a particular user, "user-specific" parameters, which vary between users, may be defined for an activity. Accordingly, while the global parameters of an activity are the same for all users, each user that adds an activity may customize their user-specific parameters for the activity. For instance, user-specific parameters may be used to specify: (a) plans regarding the activity (e.g., "I want to do it", "I want to do it again, but not for a few weeks," "I must do it before December 25," "I never want to do it again," etc.), (b) the user's history regarding that activity (e.g., I went there with Lauren on November 4 and again with Ryan on November 28), (c) personal time constraints based on user preferences (e.g., preference of brunch early on Sunday so that time is available to digest before yoga class at noon), and/or (d) any other personal preferences that may overrides or modify the global parameters (e.g., "I like to go to Boogaloo's restaurant when I'm sad because it cheers me up," "I like to go to Boogaloo's restaurant when I have friends in town," etc.).

In a further aspect, an activity may be designated as a "public" or "private" activity. Depending on how a given activity is defined, this designation may be made by setting a global parameter when the activity is created (and thus apply to all users who add the activity), and/or may be made via a user-specific parameter that is settable by each user who adds an activity.

An activity that is designated as "public" via a global parameter may be viewable (and thus addable) to all users, whereas an activity that is designated as "private" via a global parameter may only be viewable to the creator of the activity. In some implementations, a global parameter may be set to designate an activity as a "private shared" activity, in which case the activity may only be viewable by the author and the users the author specifies. Further, the fact that a given activity is designated as "public," "private," or "private shared" via a global parameter may be interpreted as a signal relevant to the importance of the activity to a certain user.

When an activity is designated as "private" via a user-specific parameter, other users are generally not notified that the user has added the activity. And when an activity is designated as "public" via a user-specific parameter, other users may be notified and/or be able to see that the user has added the activity. Further, when an activity is designated as "public" via a user-specific parameter, the user may be able to define which other users can view and/or which other users should be notified that they have added the activity.

In some implementations, an "activity assistant" is provided, which is configured to evaluate the relative importance of activities to a particular user so that activities can be presented on the activity assistant user interface in a logical manner. In particular, the activity assistant may score an activity based not only on the characteristics of the activity itself, but also based on data that is indicative of the user's "context" (e.g., the user's, interests, intents, moods, experiences, associations with other users, etc.). With the support of the activity assistant, the activity assistant user interface may therefore provide users with a dynamic and flexible mechanism for deciding what activities they might enjoy, and how they would like to spend their time.

In order to quantify the importance of a particular activity for a particular user, the activity assistant may identify and/or determine any number of "signals" that may be directly or indirectly relevant to the importance of an activity to the particular user. From the perspective of the activity assistant, signals may take the form of information provided by global parameters and user-specific parameters taken individually or information determined by evaluating interactions between global parameters, user-specific parameters, and/or other data sources. The activity assistant may evaluate the signals for a particular combination of user and activity, and based on the signals, quantify the importance of the particular activity for the particular user (e.g., by assigning a "score" to the activity).

To provide some examples of such signals, they may include but are not limited to: the level of similarity between user's mood and activity mood, the level of similarity between the user's context (as indicated by user-specific signals and/or user-specific parameters indicating, for example, whether the user is on a desktop computer/mobile phone, on-line/off-line, talking on the phone, driving, walking, etc.) and corresponding activity context requirements and/or restrictions (as indicated by global parameters of the activity), a distance between the user's current detected (or indicated) location and the activity location (if available), the appropriateness of the activity for the current weather conditions at the user's current or indicated location and/or the current weather conditions at the activity's indicated location (e.g., rainy, sunny, snowy, etc.), a user-designated priority for the activity, a user-designated due date (or next due date, if recurring), a user's snooze history or pattern for the activity, an amount of time required for the activity, a progress or status of the activity (done, active, in-progress, etc.), ownership of the activity (e.g., whether the owner is the particular user in question or another user), whether the user received an invitation to the activity or just a notice that the activity exists (e.g., a "heads-up"), a popularity of the activity (e.g., number of comments on an activity, or the number of people who have commented, copied, liked, shared, done, or followed the activity), a similarity between a user query string and the activity text (for search/suggest), a similarity between a user query string and the names or e-mails of other users associated with the activity (for search/suggest), a similarity between user query string and activity comment text (for search/suggest), and whether the user indicated another user with whom to participate in the activity with. Other possibilities exist as well.

Supported with this intelligence from the activity assistant, the activity assistant user interface may present activities that a particular user has associated with their account in a logical order that is based at least in part upon the relative importance of the activities to the user. In particular, the activity assistant may evaluate the signals for each activity in a user's activity list (e.g., each activity that has been added by the user) and assign a score to the activity. The activity assistant can then rank the activities in the user's activity list according to their respectively determined score, and relay this information to the activity assistant user interface so that it can adjust the displayed activity list accordingly.

Further, the intelligence of the activity assistant may be utilized to provide "suggested" activities that are tailored to the particular user's preferences, tendencies, location, time table, and/or mood at a given point in time. In particular, the activity assistant may initiate an activity search that takes into account the scores of activities when ranking the search results, and these search results may be presented to the user via the activity assistant user interface. In a similar manner, the activity assistant may support an "activity search" feature of the activity assistant user interface. This feature may allow the user to enter text and initiate an activity search on the text, the results of which factor in the relative scores of activities as assessed by the activity assistant.

For situations in which the systems discussed herein collect personal information about users, in some implementations, the users may be provided with an opportunity to opt in/out of programs or features that may collect personal information (e.g., information about a user's preferences or a user's contributions to social content providers). In addition, in some implementations, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

According to an example implementation, a user interface is provided that allows for intuitive user interaction with such activities. This user interface may be generally referred to herein as an "activity assistant user interface". A user typically accesses the activity assistant user interface by logging in to a user's activity-assistant account. According to an example implementation, the activity assistant user interface displays graphical representations of activities to a user in a logical manner that varies according to the interests, intents, associations with other users, and/or moods of the user. Via the activity assistant user interface, the user may view activities they have added to a personal "activity list," view suggested activities, create and add new activities to their activity list, and/or add/delete existing activities (e.g., those created by other users) to/from their activity list, among other functions.

In particular, the user can perform a number of actions in the process of interacting with the activity assistant UI, e.g., time-related actions. Examples of time-related actions include, but are not limited to, setting time-related priorities and processing time-related signals for activities (e.g., "snoozing" or "ASAP-ing" items), setting time-related parameters for activities (e.g., start-time, end-time, timing-priority, duration, and/or time-period parameters) and setting activity status and processing status-related signals (e.g., marking an activity as "in progress," "scheduled," or "completed"). For example, an activity, e.g., "walk the dog" can start at a start-time of 5 PM, have a duration of 20 minutes, and have a time period of 24 hours (once a day) with a status of "scheduled" at 4:30 PM, "in progress" at 5:10 PM, and "completed" at 6:00 PM.

The activity assistant can use signals to infer the level of user intent and interest. For example, when a user marks an activity "completed" once every two weeks, the activity assistant can infer that the activity can have a higher-priority and/or be rescheduled around two weeks after it was last done. If a user has repeatedly lowered a timing-priority of an item, the activity assistant can infer that the activity can have a lower-priority and/or be rescheduled more than two weeks after it was last done.

Additional signals beyond time-related signals can affect a ranking of an activity. For example, the activity assistant can infer that, based on a location and/or a time of day, a user does or does not want to see an activity at a particular setting and/or time. For example, if an activity entitled "Complete Reports" is activated at 3 PM when the user is near their work location, and a status signal of "in progress" is received, then the activity assistant can infer that completing reports should be shown at 3 PM. However, if the same activity is activated at 8 PM when the user happens to be passing by their work location and a time-related signal to decrease the priority of the "Complete Reports" activity, then the activity assistant can infer that completing reports should not be performed at 8 PM.

In a related example, if the "Complete Reports" activity is activated at 3 PM when the user is not near their work location (e.g., taking a day off, working from another location, sick, etc.) and a time-related signal to decrease the priority of the "Complete Reports" activity, then the activity assistant can infer that completing reports should not be performed when the user is not near their work location, even if the user usually completes reports at a given time (e.g., 3 PM daily during the work week).

If a given activity A1 is selected relatively frequently, then the activity assistant can infer from this relatively-frequent selection of A1 that a user has a relatively-high amount of interest in A1. Based on this relative-frequency of selection, the activity assistant can generate a signal indicating that activity A1 should have an increased rank.

The activity assistant can receive as inputs start-time and end-time signals of a given activity A2. Based on these signals, the activity assistant can determine the start-time, end-time, and/or duration time-related parameters of A2. In some implementations, the activity assistant UI can allow the user to make selection that A2 has started, and a later selection that A2 has ended. For example, the user can select one or more buttons or other UI-widgets to start and/or stop activity timing and generate the respective start-time and end-time signals.

The start-time, end-time, and/or duration time-related parameters can be communicated between activities (e.g., communicate time-related parameters for the "Complete Reports for Co-Worker" activity to similar activities, e.g., "Complete Reports for Mr. Boss"). In this fashion, timing histories, including stored time-related parameters from several activations of various activities, can be generated and used to predict timing parameters for other related activities.

In particular, stored time-related parameters can be used to aid a user when performing a recurring activity. For example, suppose a user had a "Call Mom" activity. If timing-related parameters, e.g., duration and activity completion history, of this activity were stored, the activity assistant could estimate how long the "Call Mom" activity would take in the future and remind the user when they should complete the "Call Mom" activity again. The time-related parameter of duration of an item or "lead time" can be combined with the activity completion history by the activity assistant to decide how soon to start reminding the user that an activity needs to be performed again.

Further, the activity assistant can learn when certain "lead" activities are often performed with other "co-performed" activities. In this regard, a lead activity, in some implementations, refers to an initial activity that is performed or completed with one or more other activities. In such scenarios, the timing-related parameters (e.g., duration, lead time) and/or priorities of the co-performed activities can be changed in accordance with the lead activity (and vice versa). Continuing the "Call Mom" example above, suppose that certain other co-performed activities, e.g., "Visit Home" or "Get Medication", are often completed near the time that the lead "Call Mom" activity is completed. In this example, if the "Call Mom" activity is snoozed, then the co-performed activity of "Visit Home" or "Get Medication" can be snoozed based on the snoozing of the lead activity. Similarly, snoozing the "Get Medication" or "Visit Home" co-performed activity can effectively snooze the "Call Mom" lead activity.

In some implementations, a user can be prompted to designate, add and/or confirm lead and/or co-related activities. For example, if the activity assistant determines a relationship between a "Go out with Friends" activity and a "Sleep Late" activity, the activity assistant can prompt a user to: add a "Sleep Late" activity upon adding a "Go out with Friends" activity, indicate that "Go out with Friends" and "Sleep Late" are co-performed activities, indicate that the "Go out with Friends" or the "Sleep Late" activity is a lead activity, and/or designate one co-performed activity as a lead activity. Many other examples of lead and co-performed activities are possible as well.

Turning to the figures, FIG. 1 depicts a network in accordance with an example implementation. In network 100, activity assistant server 108 and possibly activity content server 102 are configured to communicate, via a network 106, with client devices 104a, 104b, and 104c. As shown in FIG. 1, client devices can include a personal computer 104a, a telephone 104b, and a smart-phone 104c. More generally, the client devices 104a, 104b, and 104c (or any additional client devices) can be any sort of computing device, e.g., an ordinary laptop computer, desktop computer, network terminal, wireless communication device (e.g., a cell phone or smart phone), and so on.

The network 106 can correspond to a local area network, a wide area network, a corporate intranet, the public Internet, combinations thereof, or any other type of network(s) configured to provide communication between networked computing devices. Activity content server 102 can provide content to client device 104a-104c and/or activity assistant server 108. The content can include, but is not limited to, web pages, hypertext, scripts, binary data, e.g., compiled software, images, audio, and/or video. The content can include compressed and/or uncompressed content and/or encrypted and/or unencrypted content. Other types of content are possible as well.

In an alternative arrangement, activity assistant server 108 and activity content server 102 can be co-located and/or combined as a common server. Further, it also possible that activity assistant server 108 and/or activity content server 102 can be accessible via a network separate from the network 106. Yet further, although FIG. 1 only shows three client devices, activity assistant server 108 and/or activity content server 102 can serve any number of client devices (from a single client device to hundreds, thousands, or even more client devices).

Global activity database 112 typically includes activity data that defines a plurality of activities. In particular, the activity data for each activity may include one or more global activity parameters that collectively define the global context for the activity. Further, user-account database 110 may include per-account data for users' activity accounts. This per-account data may include, for a given one of the accounts, data indicating user-specific parameters and signals. Further, for a given activity account, the per-account data may include an indication of which activities, if any, are associated with the account (e.g., the activities that a user has added to their activity list).

According to an example implementation, activity assistant server 108 embodies the "activity assistant" and thus is configured to provide the activity-assistant functionality described herein. In particular, activity assistant server 108 may be configured to identify signals relating to the importance of a particular activity to a particular user (e.g., relating to a given user-activity pair), so that activities can be logically displayed to a user, suggested to a user, and/or searched for a user via an activity assistant UI.

In some implementations, activity-assistant functionality described herein may also be performed by software on the device, e.g., but not limited to, devices 104a, 104b, and 104c as shown in FIG. 1. For example, the client software running on the device, e.g., but not limited to, devices 104a, 104b, and 104c as shown in FIG. 1 may perform all or some portion of the ranking functionality and/or provide more advanced assistance, e.g. by providing a latitude/longitude and/or map for an address entered by the user via an activity assistant user interface and/or by directly communicating with an activity assistant processing system.

The activity assistant server 108 may acquire the data from which signals are determined, and/or data directly providing signals, from a number of different data sources. For example, activity content server 102 may provide activity assistant server 108 with access to global activity database 112 and user-account database 110. Thus, when evaluating the importance of a particular activity to a particular user, activity assistant server 108 may retrieve the global parameters of the activity from global activity database 112, as well as user-specific parameters from user-account database 110.

Figure 2A:
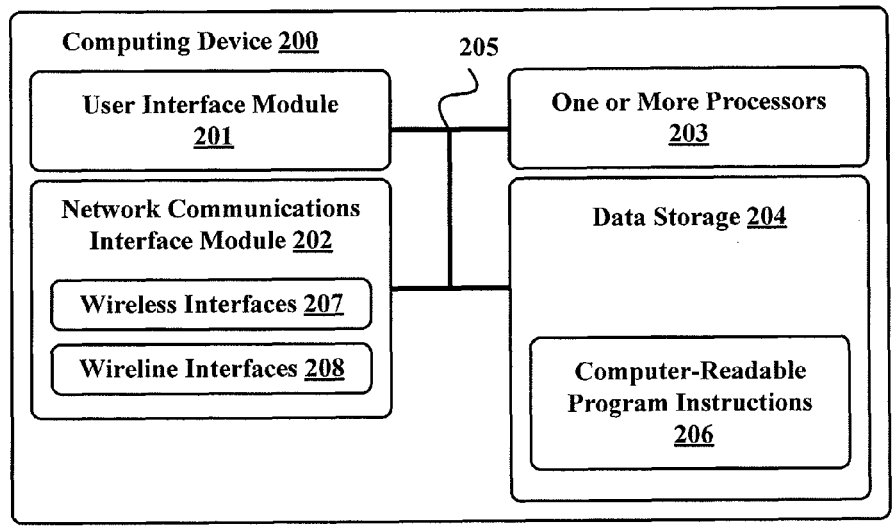
FIG. 2A is a block diagram of a computing device in accordance with an example implementation.

FIG. 2A is a block diagram of a computing device 200 in accordance with an example implementation. Computing device 200 can be configured to perform one or more functions of activity content server 102, client devices 104a, 104b, and 104c, activity assistant server 108, user account datastore 110, and/or universal activity datastore 112. The computing device 200 can include a user interface module 201, a network-communication interface module 202, one or more processors 203, and data storage 204, all of which can be linked together via a system bus, network, or other connection mechanism 205.

The user interface module 201 can be operable to send data to and/or receive data from external user input/output devices. For example, the user interface module 201 can be configured to send/receive data to/from user input devices, e.g., a keyboard, a keypad, a touch screen, a computer mouse, a track ball, a joystick, a microphone, and/or other similar devices, now known or later developed. The user interface module 201 can also be configured to provide output to user display devices, e.g., one or more cathode ray tubes (CRT), liquid crystal displays (LCD), light emitting diodes (LEDs), displays using digital light processing (DLP) technology, printers, light bulbs, and/or other similar devices, now known or later developed. The user interface module 201 can also be configured to receive audible input(s) via the microphone (or similar audio input device) and/or generate audible output(s), e.g., a speaker, speaker jack, audio output port, audio output device, earphones, and/or other similar devices, now known or later developed.

The network-communications interface module 202 can include one or more wireless interfaces 207 and/or wireline interfaces 208 that are configurable to communicate via a network, e.g., the network 106 shown in FIG. 1. The wireless interfaces 207 can include one or more wireless transceivers, e.g., a Bluetooth transceiver, a Wi-Fi transceiver perhaps operating in accordance with an IEEE 802.11 standard (e.g., 802.11a, 802.11b, or 802.11g), a WiMAX transceiver perhaps operating in accordance with an IEEE 802.16 standard, and/or other types of wireless transceivers configurable to communicate via a wireless network. The wireline interfaces 208 can include one or more wireline transceivers, e.g., an Ethernet transceiver, a Universal Serial Bus (USB) transceiver, or similar transceiver configurable to communicate via a wire, a twisted pair of wires, a coaxial cable, an optical link, a fiber-optic link, or other physical connection to a wireline network.

In some implementations, the network communications interface module 202 can be configured to provide reliable, secured, compressed, and/or authenticated communications. For each communication described herein, information for ensuring reliable communications (e.g., guaranteed message delivery) can be provided, perhaps as part of a message header and/or footer (e.g., packet/message sequencing information, encapsulation header(s) and/or footer(s), size/time information, and transmission verification information, e.g., cyclic redundancy check (CRC) and/or parity check values). Communications can be compressed and decompressed using one or more compression and/or decompression algorithms and/or protocols, e.g., but not limited to, one or more lossless data compression algorithms and/or one or more lossy data compression algorithms. Communications can be made secure (e.g., be encoded or encrypted) and/or decrypted/decoded using one or more cryptographic protocols and/or algorithms, e.g., but not limited to, DES, AES, RSA, Diffie-Hellman, and/or DSA. Other cryptographic protocols and/or algorithms can be used as well or in addition to those listed herein to secure (and then decrypt/decode) communications.

The one or more processors 203 can include one or more general purpose processors and/or one or more special purpose processors (e.g., digital signal processors, application specific integrated circuits, etc.). The one or more processors 203 can be configured to execute computer-readable program instructions 206 that are contained in the data storage 204 and/or other instructions as described herein.

The data storage 204 can include one or more computer-readable storage media that can be read or accessed by at least one of the processors 203. The one or more computer-readable storage media can include volatile and/or non-volatile storage components, e.g., optical, magnetic, organic or other memory or disc storage, which can be integrated in whole or in part with at least one of the one or more processors 203. In some implementations, the data storage 204 can be implemented using a single physical device (e.g., one optical, magnetic, organic or other memory or disc storage unit), while in other implementations, the data storage 204 can be implemented using two or more physical devices.

Computer-readable storage media associated with data storage 204 and/or other computer-readable media described herein can also include non-transitory computer-readable media, e.g., computer-readable media that stores data for short periods of time like register memory, processor cache, and random access memory (RAM). Computer-readable storage media associated with data storage 204 and/or other computer-readable media described herein can also include non-transitory computer readable media that stores program code and/or data for longer periods of time, e.g., secondary or persistent long term storage, like read only memory (ROM), optical or magnetic disks, compact-disc read only memory (CD-ROM), for example. Computer-readable storage media associated with data storage 204 and/or other computer-readable media described herein can also be any other volatile or non-volatile storage systems. Computer-readable storage media associated with data storage 204 and/or other computer-readable media described herein can be considered computer readable storage media for example, or a tangible storage device.

The data storage 204 can include computer-readable program instructions 206 and perhaps additional data. In some implementations, the data storage 204 can additionally include storage required to perform at least part of the herein-described techniques, methods (e.g., method 800), and/or at least part of the functionality of the herein-described devices and networks.

Figure 2B:
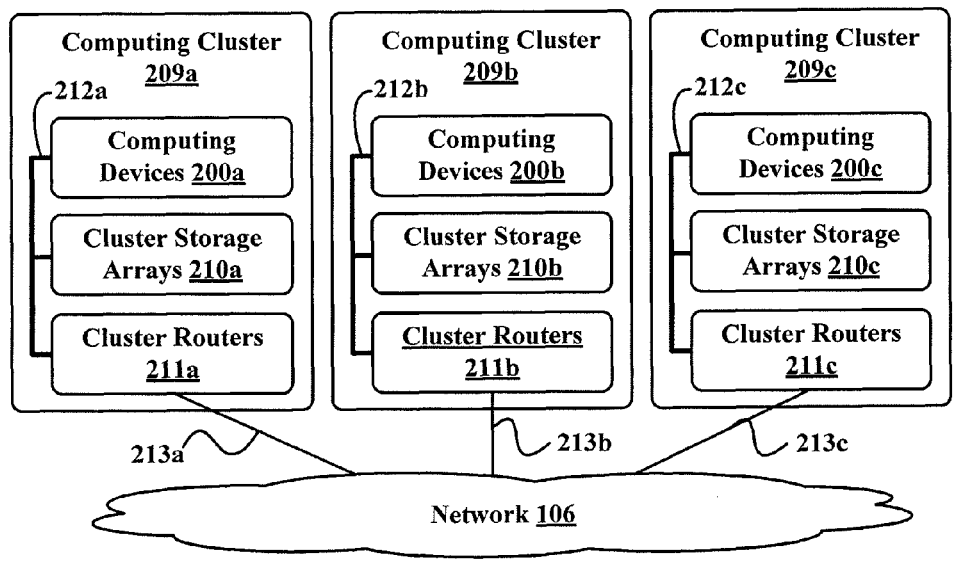
FIG. 2B depicts a network with computing clusters in accordance with an example implementation.

FIG. 2B depicts a network 106 with computing clusters 209a, 209b, and 209c in accordance with an example implementation. In FIG. 2B, functions of activity content server 102, activity assistant server 108, user account datastore 110, and/or universal activity datastore 112 can be distributed among three computing clusters 209a, 209b, and 208c. The computing cluster 209a can include one or more computing devices 200a, cluster storage arrays 210a, and cluster routers 211a connected by local cluster network 212a. Similarly, computing cluster 209b can include one or more computing devices 200b, cluster storage arrays 210b, and cluster routers 211b connected by local cluster network 212b. Likewise, computing cluster 209c can include one or more computing devices 200c, cluster storage arrays 210c, and cluster routers 211c connected by a local cluster network 212c.

In some implementations, each of computing clusters 209a, 209b, and 209c can have an equal number of computing devices, an equal number of cluster storage arrays, and an equal number of cluster routers. In other implementations, however, some or all of computing clusters 209a, 209b, and 209c can have different numbers of computing devices, different numbers of cluster storage arrays, and/or different numbers of cluster routers. The number of computing devices, cluster storage arrays, and cluster routers in each computing cluster can depend on the computing task or tasks assigned to each computing cluster.

In computing cluster 209a, for example, computing devices 200a can be configured to perform various computing tasks of activity content server 102. In one implementation, the various functionalities of activity content server 102 can be distributed among one or more of the computing devices 200a. For example, some of these computing devices can be configured to provide part or all of a first set of content while the remaining computing devices can provide part or all of a second set of content. Still other computing devices of the computing cluster 209a can be configured to communicate with activity assistant server 108. Computing devices 200b and 200c in computing clusters 209b and 209c can be configured the same or similarly to the computing devices 200a in computing cluster 209a.

On the other hand, in some implementations, computing devices 200a, 200b, and 200c each can be configured to perform different functions. For example, computing devices 200a and 200b can be configured to perform one or more functions of user-account datastore 110, and the computing devices 200c can be configured to perform one or more functions of activity assistant server 108.

Cluster storage arrays 210a, 210b, and 210c of computing clusters 209a, 209b, and 209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of activity content server 102, activity assistant server 108, user account datastore 110, and/or universal activity datastore 112 can be distributed across computing devices 200a, 200b, and 200c of respective computing clusters 209a, 209b, and 209c, various active portions and/or backup/redundant portions of these components can be distributed across cluster storage arrays 210a, 210b, and 210c. For example, some cluster storage arrays can be configured to store data for activity assistant server 108, while other cluster storage arrays can store data for activity content server 102. Additionally, some cluster storage arrays can be configured to store backup versions of data stored in other cluster storage arrays.

The cluster routers 211a, 211b, and 211c in the computing clusters 209a, 209b, and 209c can include networking equipment configured to provide internal and external communications for the computing clusters. For example, the cluster routers 211a in the computing cluster 209a can include one or more internet switching and/or routing devices configured to provide (i) local area network communications between the computing devices 200a and the cluster storage arrays 201a via the local cluster network 212a, and/or (ii) wide area network communications between the computing cluster 209a and the computing clusters 209b and 209c via the wide area network connection 213a to the network 106. The cluster routers 211b and 211c can include network equipment similar to the cluster routers 211a, and the cluster routers 211b and 211c can perform similar networking functions for the computing clusters 209b and 209b that the cluster routers 211a perform for the computing cluster 209a.

In some implementations, computing tasks and stored data associated with activity content server 102, activity assistant server 108, user account datastore 110, and/or universal activity datastore 112 can be distributed across the computing devices 200a, 200b, and 200c based at least in part on the processing requirements for functions of activity content server 102, activity assistant server 108, user account datastore 110, and/or universal activity datastore 112, the processing capabilities of the computing devices 200a, 200b, and 200c, the latency of the local cluster networks 212a, 212b, and 212c, the wide area network connections 213a, 213b, and 213c, and/or other factors that can contribute to the cost, speed, fault-tolerance, resiliency, efficiency, and/or other design goals of the overall system architecture.

Additionally, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of the local cluster networks 212a, 212b, 212c, the latency, throughput, and cost of the wide area network connections 213a, 213b, and 213c, and/or other factors that can contribute to the cost, speed, fault-tolerance, resiliency, efficiency and/or other design goals of the system architecture.

Figure 3A:
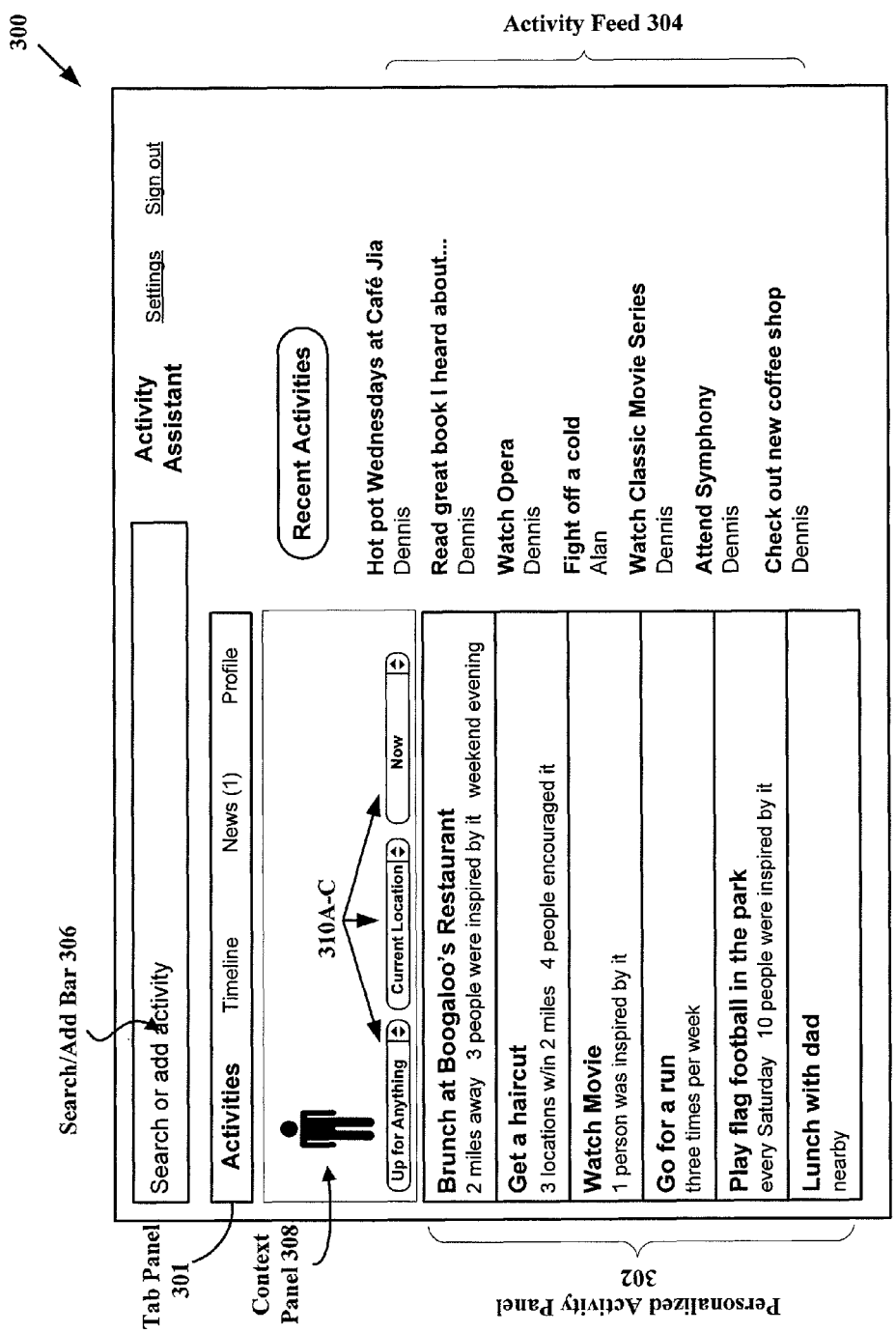
FIG. 3A is a block diagram illustrating features of a user interface, according to an example implementation.

FIG. 3A is a block diagram illustrating features of a user interface, according to an example implementation. In particular, activity-assistant user interface 300 may be displayed via a client device once a user has logged in to their activity-assistant account, and may allow a user to interact with an activity assistant. While only one screen of the activity-assistant user interface 300 is shown, it should be understood that the activity-assistant user interface may include other screens, which provide additional functionality, without departing from the scope of the invention. As shown, activity-assistant user interface 300 includes a personalized activity panel 302, an activity feed 304 that displays activities that have been added, done, and/or recently updated by friends of the user (or members of the user's social graph and/or social network), a search/add bar 306, and a context panel 308. Further, context panel 308 includes a number of input mechanisms 310 A-C via which a user can input context signals.

The tab menu panel 301 acts as a menu selection bar, and may determine the content of the remainder of the user interface 300. As shown in FIG. 3A, the Activities tab is currently selected, and as a result, the personalized activity panel 302 and the activity feed 304 are displayed. The Timeline tab may bring up a time-based ordering of activities. The News tab may bring up a listing of activities, announcements, and/or actions (e.g., "today your friend did the activity 'watch movie' that you inspired him/her to add") of other users with which the current user is associated. The profile tab may allow the current user to modify settings, e.g., login preferences, display settings, and/or how the current user's information appears to other users (name, privacy settings, etc), among others. In some implementations, a subset of the tabs illustrated in FIG. 3A may be provided, and in other implementations, a superset of the tabs may be provided.

The context panel 308 provides an interactive mechanism for users to provide context signal data that describes a "user context" (e.g. to provide signals indicative of the user's intent, interest, mood, state-of-mind, experience, perception, associations with other users, etc.). In the illustrated example, input mechanism 310A on the left of context panel 308 allows a user to signal their mood (e.g., "up for anything", "lazy", "productive", "social", etc.). The input mechanism 310B in the center of context panel 308 allows a user to signal a location (e.g., "current location", "home", "work", "stadium", etc.). Further, input mechanism 310C on the right of context panel 308 allows a user to signal a time or timeframe (e.g., "now", "tomorrow", "tonight", "next Wednesday morning", "2:00 AM CST", "9:00 PM EST on Saturday", etc.). Other input mechanisms are possible as well.

While the context information provided via the input mechanisms of the context panel 308 may be referred to as "signals" from the user, it should be understood that, programmatically, this information may take the form of user-specific parameters that are associated with the user's activity account. As such, the data provided via input mechanisms 310A-C may be stored in a user-account database. For example, referring back to FIG. 1, data from input mechanisms 310A-C may be stored as user-specific parameters in user-account database 110. It is also possible that activity assistant server 108 may be fed data or may pull data directly from input mechanisms 310 in real-time.

The context signal data acquired from the context panel 308 (e.g., user-specific parameters related to "user context") may be combined by the activity assistant (e.g., activity-assistant server 108 and/or activity content server 102) with global parameters of a given activity, other user-specific parameters, and/or data from other sources, in order to derive signals indicative of activity-importance of the given activity to the user. In this context, the "signals" are the information relative to the importance of the activity that is derived from the data (e.g., the user-specific parameters, global parameters, etc.). As such, the activity assistant may interpret a user-parameter as a signal in and of itself.

For instance, the user's mood (provided via input mechanism 310A) may be interpreted as a signal that makes any number of activities more or less important for the user. As a specific example, if the user's mood is "lazy", the activity "watching a movie" may become more important than it otherwise would be (as global parameters may indicate that "lazy" is a mood associated with the "watching a movie" activity). On the other hand, the activity "go to the gym" may become less important than it otherwise would be (as global parameters of "watching a movie" do not typically include "lazy" as an associated mood, or may in fact indicate that "lazy" is a mood that is likely incompatible with this activity).

The activity assistant may also derive more complex signals by evaluating the relationships and/or interactions between user-specific parameters, global parameters, and/or other data items. To provide an example, a user may have provided a "love being outdoors" signal, which may be stored in the user's account as a user-specific parameter (note that a user interface input mechanism not shown on the user interface 300, but is contemplated as being available). At a given point in time, the user also may have set their mood to "active" via input mechanism 310A, set their location to "current location" via input mechanism 310B, and set their time to "tomorrow afternoon". The activity assistant may interpret this data as including a signal that the user would like to do something active tomorrow afternoon at the same place they are currently located.

Further, the activity assistant may use other data sources to determine other relevant signals, e.g., the weather forecast for the next day at the user's current location or the location that the user will likely be at the next day. Tomorrow afternoon's weather forecast may thus be a signal, which can be combined with the signal derived from the user-specific parameters to provide a more-refined signal that, for example, outdoor fitness or sporting activities near the user's location should always be favored over indoor fitness or sporting activities near the user's location, unless the tomorrow afternoon's forecast is for rain, in which case the amount by which outdoor activities are favored over indoor activities may be reduced (or indoor activities may actually be favored). For instance, combining all of this information, the activity assistant may increase the importance of active outdoor activities (e.g., "go for a run", "play flag football", etc.) to a greater extent when the forecast is for sunny weather, than when the forecast is for rain or snow.

The activity assistant may apply signal-based techniques, e.g., those described herein, to assess activity-importance for a number of activities and the importance of these activities relative to one another. This technique may be employed to provide the user with various functions that are tailored to the user's context.

For example, personalized activity panel 302 may display intelligently selected and ordered activities from a pool of activities including the activities a user has added to their account and suggested activities that have been selected for a user. For example, a number of suggested activities may be determined based on factors, e.g., user preferences, signals from the context panel, global parameters of potential activities, activities that have been added and/or done by friends of the user, and/or activities that have been added and/or done by the user in the past, among others. These suggested activities may then be combined with the activities a user has already added to create a pool of potential activities for the personalized activity panel 302. Then, to determine which specific activities to display in personalized activity panel 302, the activity assistant may quantify the importance of each activity (e.g., by evaluating signals for each activity), so that the activities that are most important to the user are displayed.

Note that personalized activity panel 302 may visually differentiate between activities that a user has already added to their account, and suggested activities. For example, the "Watch Movie" activity is displayed with a dark background and white text to indicate that it is a suggested activity (and that the user may thus wish to add it), whereas the other activities listed in personalized activity panel 302 all have a white background with black text, thus indicating that the user has already added these activities.

Further, the evaluation of importance may also be applied in the process of determining which activities should be displayed in the activity feed 304 (and possibly the order in which those activities are displayed). In particular, a certain number of the most recently-added and updated activities may be evaluated based on signals, e.g., those described above, and the most important of the recent activities may be displayed (possibly in the order of importance. Alternatively, it should be understood that activity feed 304 may simply display activities in a time-wise manner as they are added/updated/completed, without adjusting based on the user's context. In a similar manner, search results (not shown) for an activity search via search/add bar 306 may be displayed based at least in part on importance of the activities located in the search, or may simply be displayed in an order according to one of the many well-known search techniques.

Figure 3B:
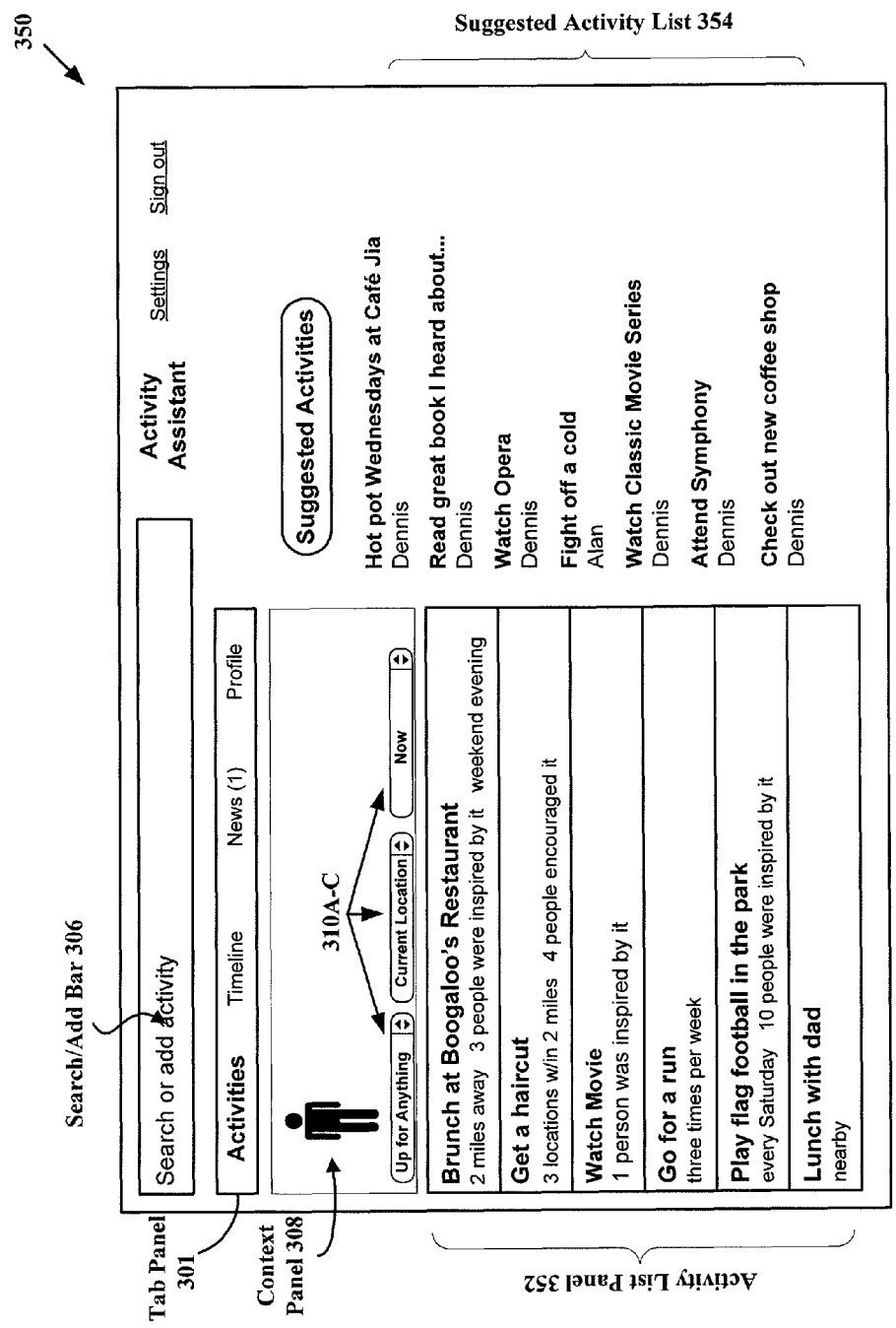
FIG. 3B is another block diagram illustrating features of a user interface, according to an example implementation.

FIG. 3B is another block diagram illustrating features of a user interface, according to an example implementation. In particular, FIG. 3B illustrates an alternative activity-assistant user interface 350, which may be displayed via a client device once a user has logged in to their activity-assistant account. Activity-assistant user interface 350 includes some of the same UI elements as activity-assistant user interface 300 of FIG. 3A (e.g., search/add bar 306 and context panel 308 including a number of input mechanisms 310 A-C). However, activity-assistant user interface 350 includes an activity list 352 and a suggested activity list 354.

In this implementation, activity list 352 may include only activities that a user has added to their account. Thus, by evaluating signals for each activity a user has added to their account, the activity assistant can determine which activities should be displayed in activity list 352 (and the order in which those activities should be displayed).

Furthermore, suggested activity list 354 may display only suggested activities (which have not yet been added by the user.) Accordingly, the importance of specific activities may also be a factor in the process of determining which activities should be displayed in the suggested activity list 354 (and the order of those activities).

Figure 4:
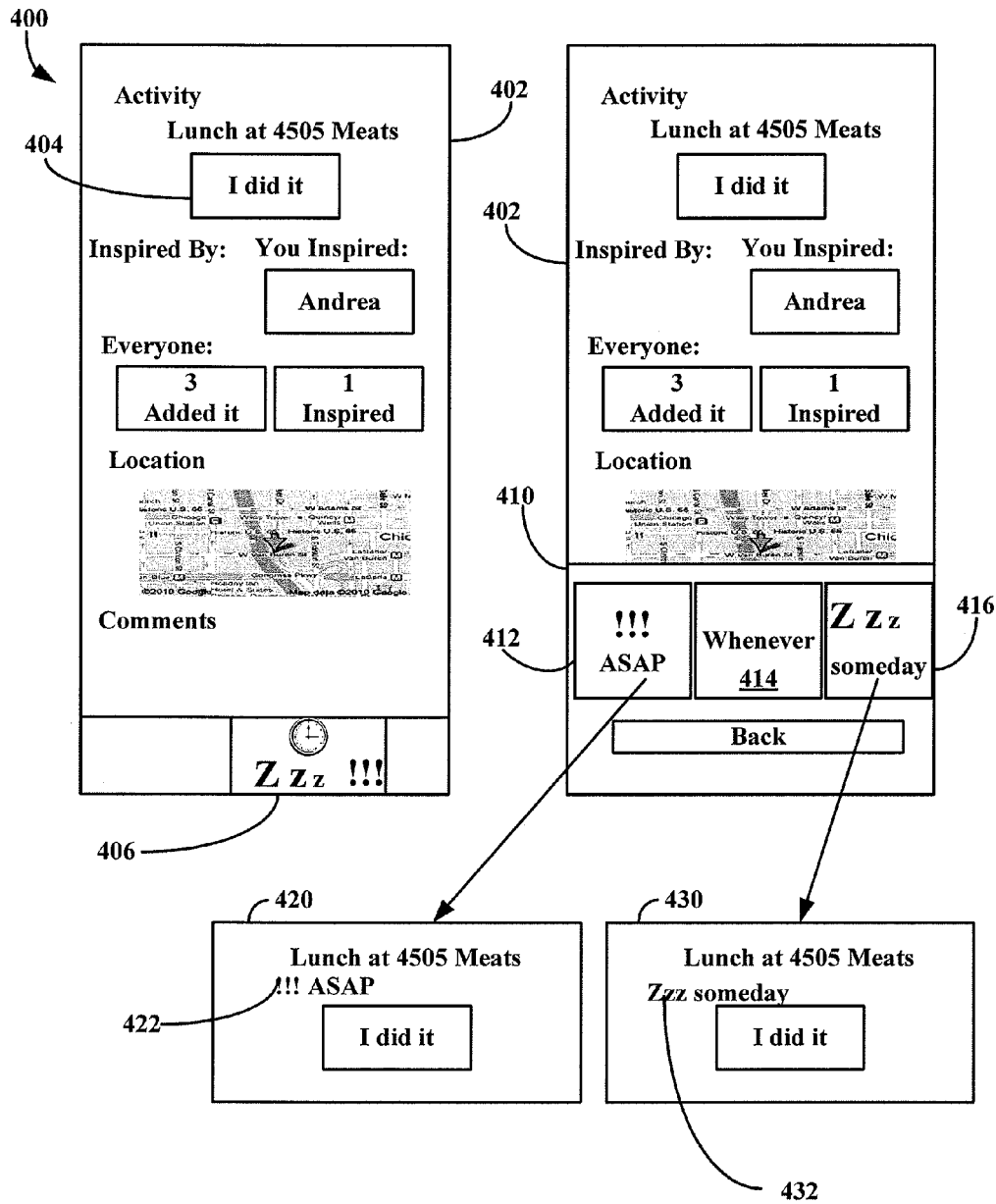
FIG. 4 depicts a scenario for adjusting time-related parameters of an activity in accordance with an example implementation.

In interacting with activity assistant server 108, time-related parameters can be modified based on various signals. FIG. 4 depicts a scenario 400 for adjusting time-related parameters of an activity. Display 402 of the activity assistant UI depicts an activity for "Lunch at 4505 Meats" that includes a "completion" button 404 shown with text of "I did it" on FIG. 4, and a "time adjustment" button 406.

In response to selecting (e.g., clicking on or pressing via touch-screen) completion button 404, a "completion" signal is sent to the corresponding activity in some configurations. In response to the completion signal, the activity is updated to determine an end-time and/or duration of an interval of time. Further, as discussed in more detail with respect to FIGS. 6A and 6B below, completion signals are used to modify time-period parameters. In examples not shown in FIG. 4, additional "status-related" signals beyond the completion signal are received by an activity, e.g., "not started" signals, "scheduled" signals, in-progress" signals, "nearly complete" signals, etc.

In response to selecting time adjustment button 406, display 402 are updated to include time-adjustment panel 410. Time-adjustment panel 410 includes increase-time-signal button 412, remove-time-signal button 414, and decrease-time-signal button 416.

Increase-time-signal button 412, when selected, can generate an "increase-timing-priority" signal to an activity, e.g., the "Lunch at 4505 Meats" activity shown in FIG. 4, to increase the timing-priority parameter for the activity. A display of the activity can provide feedback to that the timing priority has been increased. FIG. 4 shows an example partial view 420 of display 402 for the "Lunch at 4505 Meats" activity with increased-timing-priority indicator 422 of "!!! ASAP." Increased-timing-priority indicator 422 serves as a reminder to a user of display 402 that the activity of "Lunch at 4505 Meats" has an increased timing priority.

Decrease-time-signal button 416, when selected, generates a "decrease-timing-priority" signal to an activity, e.g., the "Lunch at 4505 Meats" activity shown in FIG. 4, to decrease the timing-priority parameter for the activity. A display of the activity provides feedback to that the timing priority has been decreased. FIG. 4 shows an example partial view 430 of display 402 for the "Lunch at 4505 Meats" activity with increased-timing-priority indicator 432 of "Zzz someday." Decreased-timing-priority indicator 432 serves as a reminder to a user of display 402 that the activity of "Lunch at 4505 Meats" has an decreased timing priority.

Remove-time-signal button 414, when selected, generates a "remove-timing-priority" signal to an activity, e.g., the "Lunch at 4505 Meats" activity shown in FIG. 4, to baseline the timing-priority parameter; that is, set the timing-priority parameter so that is neither increased or decreased. For example, a timing-priority scheme could involve setting the timing-priority parameter of an activity to a relatively high value (e.g., +1) upon reception of the increase-timing-priority signal, setting the timing-priority to a baseline value (e.g., 0), upon reception of the remove-timing-parameter signal, and setting the timing-priority to a relatively low value (e.g., −1) upon reception of the decrease-timing-priority signal. Many other timing priority values are possible as well.

Figures 5A, 5B:
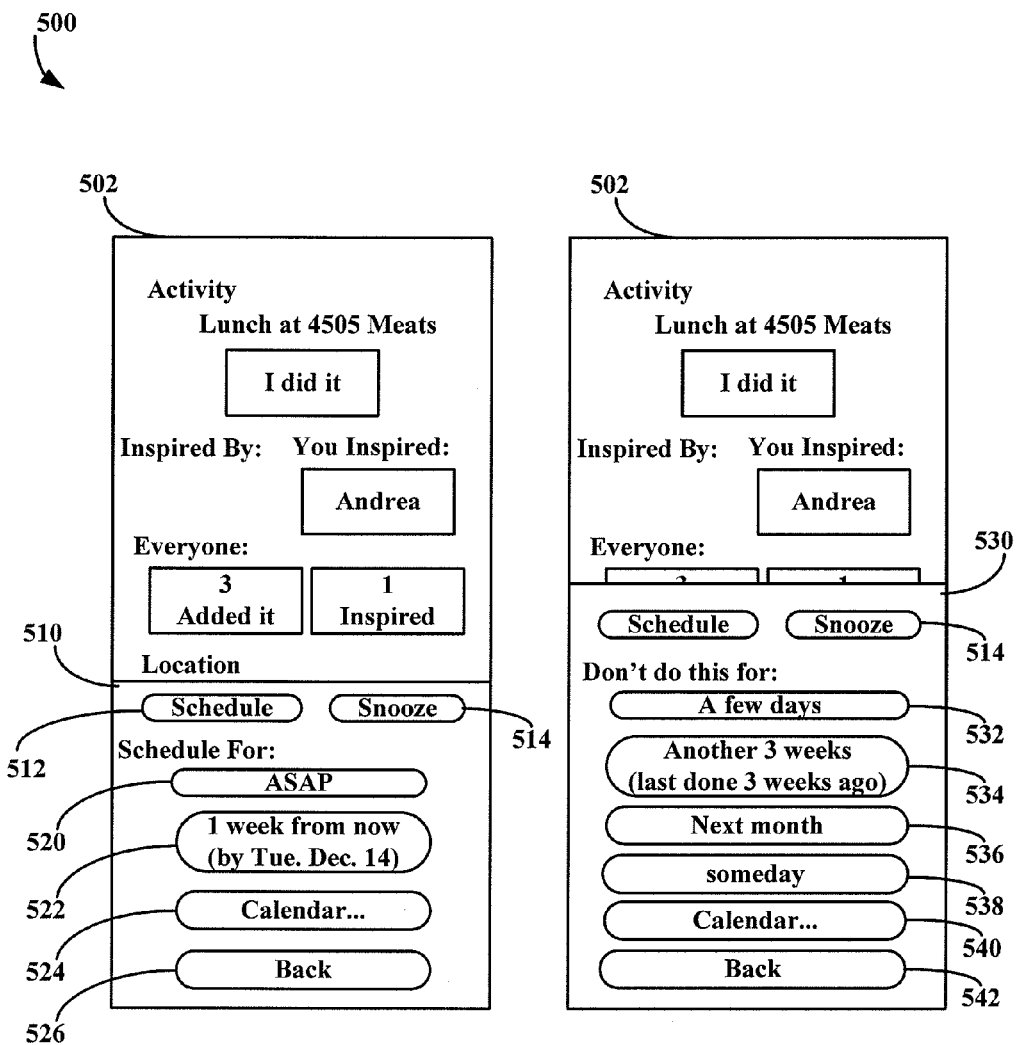
FIG. 5A illustrates a scenario for changing the timing-priority of an activity using a display in accordance with an example implementation.
FIG. 5B illustrates another scenario for changing the timing-priority of an activity using a display in accordance with an example implementation.

FIG. 5A illustrates a scenario 500 for changing the timing-priority of an activity using display 402. Scenario 500 begins when a user decides to schedule the "Lunch at 4505 Meats" activity. To schedule an activity, the activity assistant and/or activity assistant UI generates scheduling panel 510 of display 402. As shown in FIG. 5A, scheduling panel 510 includes a scheduling indicator 512, a snooze indicator 514, scheduling indicators 520-524, and back button 526. FIG. 5A shows scheduling indicator 512 in grey on scheduling panel 510 to remind the user that they are scheduling an activity.

Scheduling indicators 520-524, when selected, permit a user to indicate a time to perform an activity. For example, if the user wants to perform the "Lunch at 4505 Meats" activity shown in FIG. 5A relatively-soon, the user selects ASAP scheduling indicator 520. Scheduling indicators permit the user to schedule the activity at a fixed period of time in the future or at some other date/time in the future. FIG. 5A shows that scheduling indicator 522, if selected, permits a user to schedule the "Lunch at 4505 Meats" activity one week into the future, and that scheduling indicator 524, if selected, instructs the activity assistant UI to provide a calendar for the user to schedule the "Lunch at 4505 Meats" activity.

By selecting back button 526, the activity assistant and/or activity assistant UI removes scheduling panel 510 from display 402, thus signaling the completion of scheduling an activity in some configurations.

Scenario 500 continues with the user deciding to "snooze" or delay performance of "Lunch at 4505 Meats" activity. To snooze an activity, the activity assistant and/or activity assistant UI generates snooze panel 530 of display 402. As shown in FIG. 5B, snooze panel 530 includes scheduling indicator 512, snooze indicator 514, snooze indicators 532-540, and back button 542. FIG. 5B shows snooze indicator 514 on snooze panel 530 in grey to remind the user that they are snoozing an activity.

Snoozing indicators 532-540, when selected, permit a user to indicate an amount of time to delay performing an activity in some configurations. For example, if the user wants to perform the "Lunch at 4505 Meats" activity a few days after the current time, the user selects "A few days" snoozing indicator 532. Snoozing indicators can permit the user to delay the activity for a fixed period of time or until some other date/time in the future. FIG. 5B shows that snoozing indicator 534, if selected, permits a user to delay performance of the "Lunch at 4505 Meats" activity for three weeks, and that snoozing indicator 536, if selected, permits a user to delay performance of the Lunch at 4505 Meats" activity until next month. In some cases, the user delays the activity for an indeterminate amount of time by selecting the "someday" snoozing indicator 538. Snoozing indicator 540, if selected, instructs the activity assistant UI to provide a calendar for the user to select a time and/or date to delay performance of the "Lunch at 4505 Meats" activity.

By selecting back button 542, the activity assistant and/or activity assistant UI removes snooze panel 530 from display 402, thus signaling the completion of snoozing an activity in some configurations.

Figure 6A:
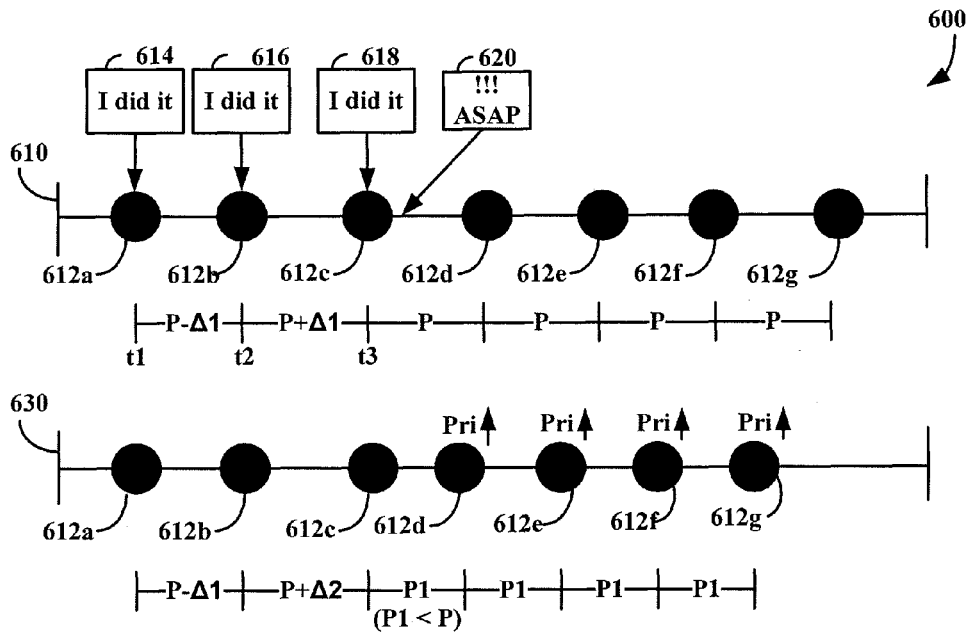
FIG. 6A shows a scenario for a number of activities arranged on a timeline in accordance with an example implementation.

Increase-timing-priority and decrease-timing-priority signals modify periodically scheduled activities in some configurations. FIG. 6A shows a scenario 600 for a number of activities 612a-612g arranged on a timeline 610 with a period of time between each adjacent pair of activities of P units of time. For example, each of activities 612a-612g can be "walking the dog" and P can correspondingly be 24 hours (daily). As another example, each periodic activity can be "cutting the lawn" and P can correspondingly be 7 days (weekly).

In some scenarios, the periodic activities may not all be the same activity; for example, a series of weekly meetings with group A can include a meeting with group B that occasionally pre-empts a weekly group-A meeting. In other scenarios, the period of time can be somewhat regular with variations in time (e.g., the periodic activities are "haircuts" for a person who gets their hair cut every 3 to 4 weeks).

Display 402 is used to generate timing-priority signals to modify periods of time between periodically occurring activities in some configurations. FIG. 6A shows reception of three completion signals (shown as "I did it") 614, 616, and 618 respectively related to activities 612a, 612b, and 612c.

A time-period parameter can be determined based on historical context, e.g., a record of reception times of signals. Times of reception of signals can be stored, either as received or as an aggregated form. For example, the activity assistant stores each time a signal of a given type (e.g., completion, increase-timing-priority, decrease-timing-priority) is received at an activity, statistics of times between received signals of the given type (e.g., mean, median, and/or mode times, standard deviation of received signals, probabilities of reception of signals of the given type at a given time, etc.), high and/or low periods of time between signals of the given type, a count of the signals of the given type, and/or other data related to times of reception of signals.

For example, assume that completion signal 614 is received at time t1, completion signal 616 is received at time t2, and completion signal 618 is received at time t3. The period P can be determined based on the reception times t1, t2, and t3 of the completion signals. For example, P is an average difference between reception times of completion signals that can be calculated; e.g., determine t2−t1 for a period between activities 612a and 612b. FIG. 6A shows that the period between activities 612a and 612b is P−Δ1. Similarly, the period between activity 612b completed at time t2 and activity 612b completed at time t3 is P+Δ1. In this example, the average of the differences between completion rates $$\frac{(P-\Delta 1)+(P+\Delta 1)}{2}$$

equals P.

In some implementations, additional statistics, e.g., median, mode, counts, standard deviation, and/or variance of the recorded reception times of signals are determined and stored. In other implementations, once the average difference and/or any additional statistics are calculated, some or all of the stored reception time data are removed to save storage.

A determined period between two completed activities is used to schedule future periodic activities in some configurations. In scenario 600, let the current time be the time of reception of completion signal 618 (e.g., the time of completion of activity 612c). FIG. 6A shows future activities 612d-612g along timeline 610 scheduled based on period P between completed activities 612a and 612b and between completed activities 612b and 612c.

Schedules of future activities can be updated upon reception of a signal, e.g., a timing-priority signal. FIG. 6A shows that scenario 600 continuing with reception of increase-timing-priority signal 620 for activity 612d (indicated with "!!! ASAP" in FIG. 6A) at a time shortly after completion of activity 612c. In response to increase-timing-priority signal 620, the activity assistant can increase the timing-priority of activity 612d. As part of increasing the timing-priority of activity 612d, a user can be reminded of activity 612d earlier than if the timing-priority of activity 612d is not increased.

After increasing the timing-priority of activity 612d, a period of time before reminding a user about activity 612d and/or before activity 612d should be completed can be decreased.

FIG. 6A shows timeline 630 with an increase in timing-priority for activity 612d (shown as "Pri ↑" by activity 612d on timeline 630) and a corresponding decrease in the period of time from P to P1, where P1<P, before reminding a user about activity 612d and/or before activity 612d should be completed.

Another way to view the sequence of activities shown on timeline 610 is that 612a-612d is a part of a recurring sequence of activities that involves past activities 612a-c, and future activities 612d-g. FIG. 6A shows timeline 630 with an updated schedule for future activities in the recurring sequence after reception of increase-timing-priority signal 620. Future activities 612d-612g have been rescheduled to have period P1 between activities, where P1<P. Also, the timing-priority for activities 612d-612g is updated (shown as "Pri ↑" by activities 612d-612g on timeline 630). That is, as the priority of the period activities increases, the period of time between adjacent pairs of future activities in the recurring sequence can decrease.

Figure 6B:
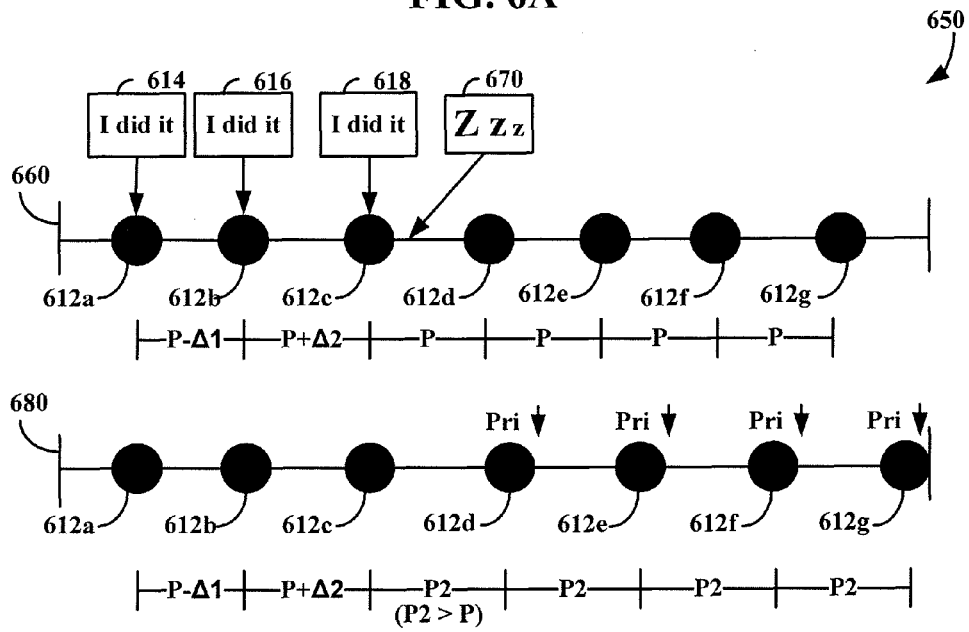
FIG. 6B shows another scenario for a number of activities arranged on a timeline in accordance with an example implementation.

FIG. 6B shows another scenario 650 for the number of activities 612a-612g arranged on a timeline 660 with a period of time between each adjacent pair of periodic activities of P units of time. In scenario 650, as in scenario 600, let the current time be the time of reception of completion signal 618 (e.g., the time of completion of activity 612c). FIG. 6A shows scenario 650 continuing with reception of decrease-timing-priority signal 670 for activity 612d (indicated with "Zzz" in FIG. 6B) at a time shortly after completion of activity 612c. In response to decrease-timing-priority signal 670, the activity assistant can decrease the timing-priority of activity 612d. As part of decreasing the timing-priority of activity 612d, a user can be reminded of activity 612d later than if the timing-priority of activity 612d is not decreased.

After decreasing the timing-priority of activity 612d, a period of time before reminding a user about activity 612d and/or before activity 612d should be completed can be increased. FIG. 6B shows timeline 670 with an decrease in timing-priority for activity 612d (shown as "Pri ↓," by activity 612d on timeline 680) and a corresponding increase in the period of time from P to P2, where P2>P, before reminding a user about activity 612d and/or before activity 612d should be completed.

Viewing the timeline 680 as recurring sequence of activities with past activities 612a-c, and future activities 612d-g, timeline 680 is shown with updated schedule for future activities after reception of decrease-timing-priority signal 670. Future activities 612d-612g have been rescheduled to have period P2 between activities, where P2<P. Also, the timing-priority for activities 612d-612g can be updated (shown as in FIG. 6B with "Pri ↓," by activities 612d-612g on timeline 630). That is, as the priority of the period activities decreases, the period of time between adjacent pairs of future activities in the recurring sequence can increase.

Figure 7:
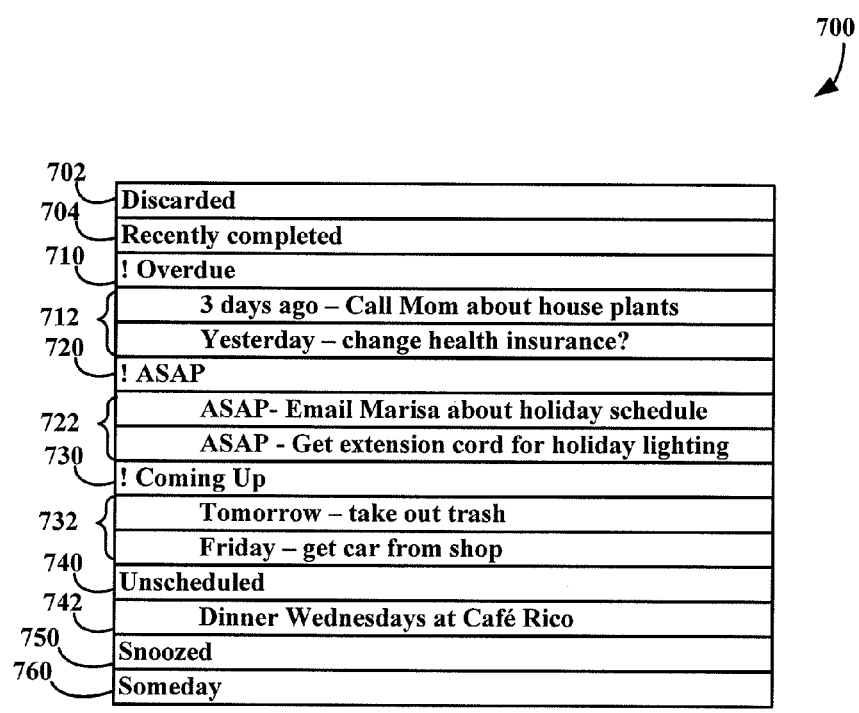
FIG. 7 shows an activity list display, in accordance with an example implementation.

FIG. 7 shows an example activity list display 700. Activity list display 700 can be generated from a subset of activities of activities stored in global activity database. The subset of activities are ranked based at least in part on timing-related priorities, status-related signals and/or parameters and/or time-related signals and/or parameters of the activities in the selected subset of activities in some configurations.

FIG. 7 shows categories of activities in the activity list 700, e.g., a discarded category 702, recently completed category 704, overdue category 710, as soon as possible (ASAP) category 720, coming up category 730, unscheduled category 740, snoozed category 750, and "someday" category 760. The categories are based on timing-related priorities, status-related signals, and/or parameters and/or time-related signals and/or parameters in some configurations.

In some cases, a category has one or more activities associated with the category. For example, FIG. 7 shows overdue category with two activities 712 in the overdue category: one activity to "Call Mom about house plants" that was due "3 days ago", and another activity to "change health insurance?" that was due "yesterday". In this fashion, activity list 700 can show a number of activities for a variety of timing and/or status-related categories.

Figure 8:
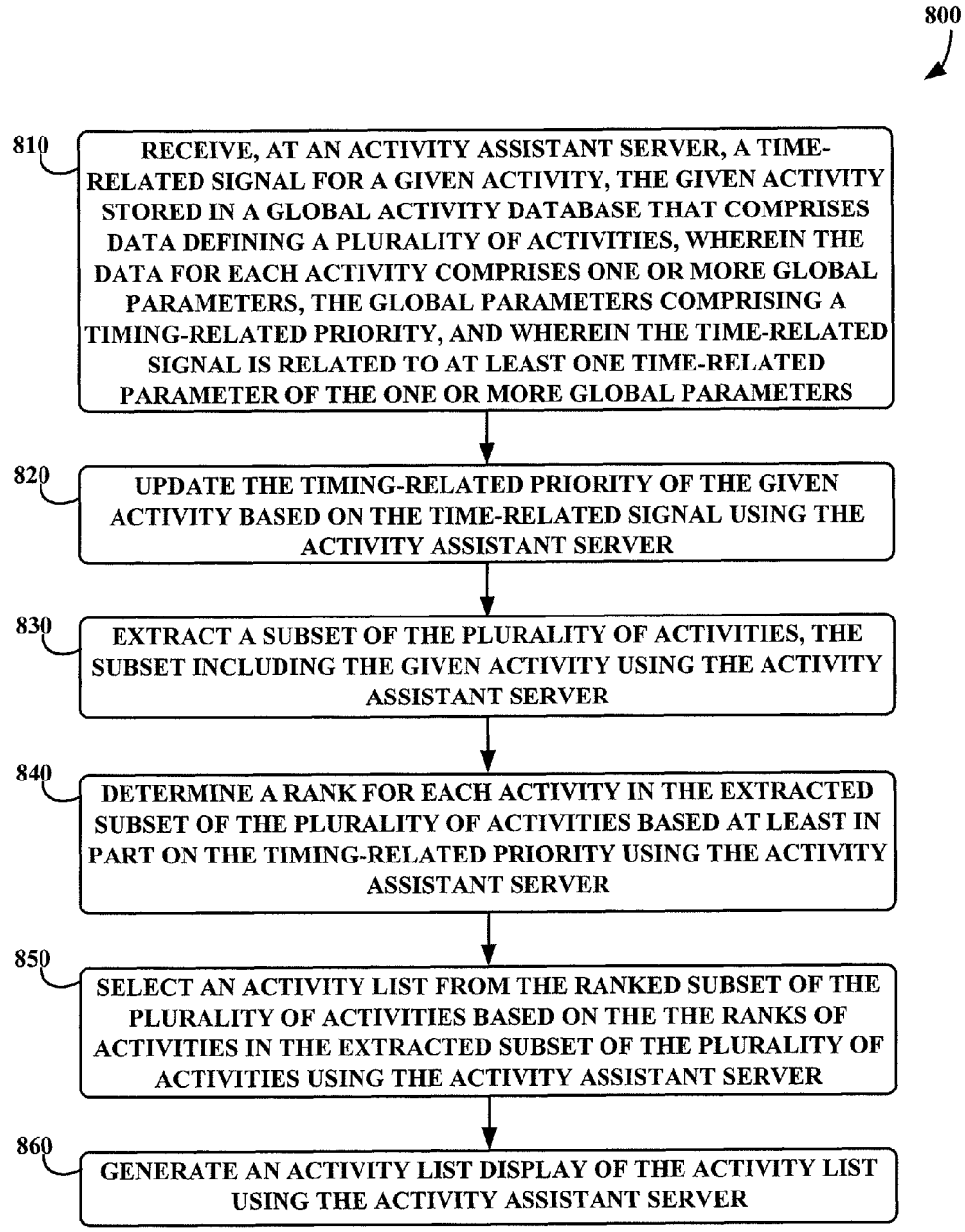
FIG. 8 is a flow chart of a method, in accordance with an example implementation.

FIG. 8 shows a flowchart of an example method 800. At block 810, an activity assistant server receives a time-related signal for a given activity. The given activity is stored in a global activity database that includes data defining two or more activities in some configurations. The data for each activity includes one or more global parameters. The global parameters include a timing-related priority. The time-related signal is related to at least one time-related parameter of the one or more global parameters.

At block 820, the activity assistant server updates the timing-related priority of the given activity based on the time-related signal using the activity assistant server.

At block 830, the activity assistant server extracts a subset of the plurality of activities. The subset can include the given activity.

At block 840, the activity assistant server determines a rank for each activity in the extracted subset of the plurality of activities. The rank is based at least in part on the timing-related priority in some configurations.

At block 850, the activity assistant server selects an activity list from the ranked subset of the plurality of activities based on the ranks of activities in the extracted subset of the plurality of activities.

At block 860, the activity assistant server generates an activity list display of the activity list.

In other implementations, some or all the procedures described with respect to method 800 as being carried out by an activity assistant server can be carried out by an activity content server, a universal activity datastore, a user-account datastore, one or more client devices, and/or by one or more other computing devices in some configurations.

With respect to any or all of the ladder diagrams, scenarios, and flow charts in the figures and as discussed herein, each block and/or communication may represent a processing of information and/or a transmission of information in accordance with example implementations. Alternative implementations are included within the scope of these example implementations. In these alternative implementations, for example, functions described as blocks, transmissions, communications, requests, responses, and/or message may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium, e.g., a storage device including a disk or hard drive or other storage medium.

The computer readable medium may also include non-transitory computer readable media, e.g., computer-readable media that stores data for short periods of time like register memory, processor cache, and random access memory (RAM). The computer readable media may also include non-transitory computer readable media that stores program code and/or data for longer periods of time, e.g., secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

It should be understood that for situations in which the systems and methods discussed herein collect personal information about users, the users may be provided with an opportunity to opt in/out of programs or features that may collect personal information (e.g., information about a user's preferences or a user's contributions to social content providers). In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

While various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims.

The following detailed description describes various features and functions of the example systems, devices, and methods with reference to the accompanying figures. It should be understood that the word "example" is used herein to mean "serving as an example, instance, or illustration." Any implementation described herein as "example" is not necessarily to be construed as preferred or advantageous over other implementations. In the figures, similar symbols typically identify similar components, unless context dictates otherwise. The illustrative implementations described in the detailed description, figures, and claims are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

What is claimed is:

1. A computer-implemented method, comprising:
  receiving a time-related signal for a given activity, the given activity stored in a global activity database that comprises data defining a plurality of activities, wherein the data for the given activity is associated with one or more global parameters, the global parameters comprising a timing-related priority, and wherein the time-related signal is related to at least one time-related parameter of the one or more global parameters, wherein the time-related signal for the given activity includes a signal for modifying the timing-related priority of the given activity, wherein the time-related signal includes a second signal for establishing a baseline for the timing-related priority of the given activity;
  determining a completion of the given activity based on the time-related signal;
  modifying a time-period parameter of the given activity based on determining the completion of the given activity, wherein the time-period parameter comprises a period of time between periodically occurring activities;
  updating the timing-related priority of the given activity based on the time-related signal;
  determining a subset of the plurality of activities as being related to the given activity based on one or more respective global parameters, the subset including the given activity;
  determining a rank for the one or more determined activities based at least in part on the timing-related priority;
  selecting an activity list from the ranked subset of the plurality of activities based on the ranks of activities in the determined subset of the plurality of activities;
  generating an activity list display of the activity list;
  storing a first time corresponding to the completion of the given activity;
  determining if a second time indicating a prior completion of the given activity exists;
  determining an elapsed period of time from the second time to the first time if the second time exists; and
  scheduling a future time for the given activity based on the determined elapsed period of time from the second time to the first time.

2. The method of claim 1, wherein the time-related signal includes a completion signal indicating that the given activity has been completed.

3. The method of claim 2, wherein updating the timing-related priority of the given activity is responsive to the completion signal.

4. The method of claim 1, wherein the time-related signal includes a second signal for indicating a time to perform the given activity.

5. The method of claim 4, wherein the second signal for indicating the time to perform the given activity schedules the given activity at a fixed period of time in the future.

6. The method of claim 1, wherein the time-related signal includes a second signal for indicating an amount of time to delay performing the given activity.

7. The method of claim 6, wherein the second signal for indicating the amount of time to delay performing the given activity comprises an indeterminate amount of time.

8. The method of claim 1, wherein the time-related parameter comprises the time-period parameter for a periodic activity, wherein the periodic activity includes one or more recurring activities based on a periodic time period.

9. The method of claim 8, wherein the time-period parameter is based on a record of reception times of one or more time-related signals.

10. The method of claim 9, wherein the one or more time-related signals are respective signals indicating respective completion times of the one or more recurring activities.

11. The method of claim 1, wherein determining the rank for each activity is further based on a location or time.

12. The method of claim 1, wherein determining the rank for each activity is further based on a number of selections by a user for each activity.

13. A system, comprising:
  memory;
  one or more processors configured at least to:
    receive a time-related signal for a given activity, the given activity stored in a global activity database that comprises data defining a plurality of activities, wherein the given activity is associated with one or more global parameters, the global parameters comprising a timing-related priority, and wherein the time-related signal is related to at least one time-related parameter of the one or more global parameters, wherein the time-related signal for the given activity includes a signal for modifying the timing-related priority of the given activity, wherein the time-related signal includes a second signal for establishing a baseline for the timing-related priority of the given activity;
    determine a completion of the given activity based on the time-related signal;
    modify a time-period parameter of the given activity based on determining the completion of the given activity, wherein the time-period parameter comprises a period of time between periodically occurring activities;
    update the timing-related priority of the given activity based on the time-related signal;
    determine a subset of the plurality of activities as being related to the given activity based on one or more respective global parameters, the subset including the given activity;
    determine a rank for the one or more determined activities based at least in part on the timing-related priority, wherein determining the rank for each activity is further based on a number of selections by a user for each activity;
    select an activity list from the ranked subset of the plurality of activities based on the ranks of activities in the determined subset of the plurality of activities;

generate an activity list display of the activity list using an activity assistant server;

store a first time corresponding to the completion of the given activity;

determine if a second time indicating a prior completion of the given activity exists;

determine an elapsed period of time from the second time to the first time if the second time exists; and schedule a future time for the given activity based on the determined elapsed period of time from the second time to the first time.

14. The system of claim 13, wherein the time-related signal includes a completion signal indicating that the given activity has been completed.

15. An article of manufacture including a tangible non-transitory computer-readable storage medium having computer-readable instructions stored thereon, which when executed by a machine, cause the machine to perform operations comprising:

receiving a time-related signal for a given activity, the given activity stored in a global activity database that comprises data defining a plurality of activities, wherein the given activity is associated with one or more global parameters, the global parameters comprising a timing-related priority, wherein the time-related signal is related to at least one time-related parameter of the one or more global parameters, wherein the time-related signal includes a signal for modifying the timing-related priority of the given activity, wherein the time-related signal includes a second signal for establishing a baseline for the timing-related priority of the given activity;

determining a completion of the given activity based on the time-related signal;

modifying a time-period parameter of the given activity based on determining the completion of the given activity, wherein the time-period parameter comprises a period of time between periodically occurring activities;

updating the timing-related priority of the given activity based on the time-related signal;

determining a subset of the plurality of activities as being related to the given activity based on one or more respective global parameters, the subset including the given activity;

determining a rank for the one or more determined activities based at least in part on the timing-related priority using an activity assistant server, wherein determining the rank for each activity is further based on a location or time;

selecting an activity list from the ranked subset of the plurality of activities based on the ranks of activities in the determined subset of the plurality of activities;

generating an activity list display of the activity list using the activity assistant server;

storing a first time corresponding to the completion of the given activity;

determining if a second time indicating a prior completion of the given activity exists;

determining an elapsed period of time from the second time to the first time if the second time exists; and scheduling a future time for the given activity based on the determined elapsed period of time from the second time to the first time.

\* \* \* \* \*